United States Patent [19]
Stiegler et al.

[11] Patent Number: 5,520,261
[45] Date of Patent: May 28, 1996

[54] STATIC TRIMMER FOR A HOVERCRAFT

[76] Inventors: Hartmut Stiegler, Krefelder Strasse 840, 41066 Mönchengladbach, Germany; Hartmut Blum, 3, chemin des Chènes, CH-2072 St. Blaise, Switzerland

[21] Appl. No.: 347,391
[22] PCT Filed: Jun. 16, 1993
[86] PCT No.: PCT/DE93/00527
   § 371 Date: Dec. 16, 1994
   § 102(e) Date: Dec. 16, 1994
[87] PCT Pub. No.: WO93/25423
   PCT Pub. Date: Dec. 23, 1993

[30] Foreign Application Priority Data

Jun. 17, 1992 [DE] Germany ............ 42 19 830.5

[51] Int. Cl.⁶ ........................................ B60V 1/04
[52] U.S. Cl. ........................................... 180/127
[58] Field of Search .................... 180/126, 127; 114/67 A

[56] References Cited

U.S. PATENT DOCUMENTS

| 3,481,423 | 12/1969 | Winter ............................ 180/127 |
| 4,448,277 | 5/1984 | Wetmore et al. ................ 180/127 |
| 4,646,866 | 3/1987 | Bertrand et al. ................ 180/126 |

FOREIGN PATENT DOCUMENTS

| 62215 | 5/1975 | Australia. |
| 2187586 | 1/1974 | France. |
| 2345327 | 10/1977 | France. |
| 1087379 | 10/1967 | United Kingdom .......... 180/127 |
| 1236571 | 6/1971 | United Kingdom. |

*Primary Examiner*—Mitchell J. Hill
*Attorney, Agent, or Firm*—Brooks & Kushman

[57] ABSTRACT

A static trimmer for a hovercraft is provided for shifting the center of buoyancy of an air-cushion of the hovercraft in relation to the center of gravity. The static trimmer includes a peripheral elastic skirt (2) having a plurality of skirt segments (5) each having a back skirt (3) and a finger skirt (4). The peripheral elastic skirt (2) further includes at least four independent lateral sections (6, 7, 8, 9) which can be moved in an inward or outward direction independently of each other. The static trimmer further includes at least two tension cables (15, 16) disposed in each independent lateral section (6, 7, 8, 9) for moving each finger skirt (4) of each of the plurality of skirt segments (5). Each of the tension cables (15, 16) further include a first partial tension cable and a second partial tension cable. The first partial tension cable acts on a base of the finger skirt (4), and the second partial tension cable acts on a connection point (19) between the back skirt (3) and the finger skirt (4), whereby the center of buoyancy of the air-cushion is displaced in relation to the center of gravity by grouped, lateral adjustments of the plurality of fingers skirts (4).

12 Claims, 9 Drawing Sheets

STATIC TRIMMER FOR A HOVERCRAFT

TECHNICAL FIELD

The invention relates to a static trimmer for a hovercraft, which has at least one compressor mechanism to generate an air-cushion, and in which the air-cushion is laterally limited by a peripheral elastic skirt consisting of a back skirt and a finger skirt, and in which the center of buoyancy of the air-cushion is displaced in relation to the center of gravity by grouped, lateral adjustment of the finger skirts.

BACKGROUND ART

Hovercraft are generally fitted with a compressor to generate the necessary air-cushion within a rubber skirt and at least one drive engine for taking straight and/or curve courses. The rubber skirt consists of a tubular, peripheral top skirt, a so-called back skirt, and a flexible, finger-type surround connected to it, a so-called finger skirt. Because these terms are common in hovercraft engineering, they will also be used in the following description for the sake of simplicity. The finger skirt can move laterally in elastic fashion and serves as a sealing collar against the ground or the surface of the water. When a curve course is taken, the hovercraft is usually steered by laterally deflecting the jet of air, for example, with a vertical rudder, such as is familiar from aircraft construction.

In such hovercraft, the bodywork tilts about the longitudinal axis of stability, the transverse axis of stability or both axes simultaneously, if the center of gravity shifts due to varying or non-uniform loading with passengers or cargo, for example.

In the worst case, this inclination about one of the axes of stability, caused by a shift in the center of gravity, can cause the rubber skirt of the hovercraft to dip into the water while travelling. In this case, the rubber skirt would be compressed to a more or less pronounced degree and the buoyancy of the air-cushion reduced in this area. The consequence of this is that the hovercraft dips even further into the water and could even flip over.

Another effect which occurs following a shift in the center of gravity is thoroughly comparable to the effect of sidewinds. This effect arises as a result of the varying gap between the rubber skirt and the ground or the surface of the water and the resultant varying release of the air from the air-cushion. The force component arising in this context pushes the hovercraft in the direction of the shift in the center of gravity.

In principle, measures to compensate for the shift in the center of gravity in hovercraft are possible by using additional trimming weights, for example. However, these measures lead to an additional weight load and, thus, to increased energy consumption.

Another possibility for trimming is familiar from FR-A-2 187 586, in which the finger skirts are each connected to the bodywork with cables. These cables define the maximum distance between the finger skirts and the bodywork. The connection points of the finger skirts to the cables are interconnected on each side by a longitudinal cable, so that the maximum distance of the finger skirts to the bodywork can be shortened by pulling the cable in the longitudinal direction. However, it is not possible to enlarge the distance to the bodywork, resulting in only limited possibilities for adjustment. In order to achieve the greatest possible trimming flexibility, the finger skirts of each side are split into two groups, each of which can be adjusted independently of the other by means of a longitudinal cable. This means that a total of four groups of finger skirts can be adjusted independently of one another.

Trimming a hovercraft with such an arrangement is complicated, as adjusting the finger skirts of one group is only capable of reducing the buoyancy of the air-cushion at this point, i.e. the finger skirts must be adjusted where the least load is present.

SUMMARY OF THE INVENTION

The underlying task of the invention is to provide a static trimmer for a hovercraft by means of which the hovercraft can be effectively trimmed or its position controlled in the event of a shift in the center of gravity, even when stationary, and by means of which the hovercraft can also be manoeuvred when stationary.

The underlying task of the invention is solved in the case of a static trimmer for a hovercraft of the type mentioned at the beginning, in that the lateral areas of the elastic skirt, which are parallel to each another, are each divided into two sections which can be shifted independently of one another, where each independently shiftable section is provided with two tension cables which, arranged at a distance from each other and guided via deflection rollers, each act on one skirt segment of the finger skirt and that each tension cable is divided within the skirt segment into two partial tension cables, of which one partial tension cable acts on the base of the skirt segment and the other partial tension cable acts on the connection between the back skirt and the finger skirt.

The invention yields the possibility of compensating for a shift in the center of gravity in a simple manner. In this context, it is expedient to shift the center of buoyancy in relation to the center of gravity until the two force components cancel each other out in the parallelogram of forces. The hovercraft is thus brought into a horizontal position in relation to the ground or the surface of the water. Because the elastic skirt is divided into two sections which can be shifted independently of one another, four sections are available, located in the lateral surfaces of the rubber skirt of the hovercraft, which allow sufficient adjustment of the air-cushion. The special arrangement of the tension cables and their division into two partial tension cables each ensures that the shape of the skirt segment does not change, even during lateral deflection caused by tensile forces, for example, and achieves better load distribution at the same time.

A compression spring is arranged between the deflection roller and the connection point of the tension cable to the skirt segment as a resetting element for the tension cable.

In order to avoid uncontrolled movement of the finger skirt in the event of a cable tearing, a safety cable is fixed between the connection point of the cable control and the deflection roller.

In a further version of the invention, each laterally shiftable section is provided with a control component.

The control component comprises a cable control, one end of which acts on the finger skirt and the other end of which is provided with a drive component comprising a cable winch fixed in place beneath the bodywork of the hovercraft.

In order to compensate for inclination of the hovercraft about the transverse axis, the sections of one side are deflected in one direction, or the sections of both parallel areas are deflected in the same direction.

In the case of minor shifts, only one of the sections need be deflected.

In order to compensate for a shift in the center of gravity towards the bow or the stern, two opposite sections are deflected either in opposite directions or in the same direction.

Inclination of the hovercraft about the longitudinal and transverse axes of stability can be compensated for by deflecting two diagonally opposite sections in the same direction.

In a special version of the invention, the sections of both sides are simultaneously pulled inwards. This causes a brief increase in the internal pressure of the air-suction, so that the danger of a wave indenting the bow area of the rubber skirt, for example, can be eradicated.

A particular advantage of the invention is that, by means of unequal deflection of the sections, it is possible to turn or laterally shift the hovercraft. A turn to the left can be executed by moving the rear sections outwards on both sides and the front sections to the right on both sides, viewed in the direction of travel.

BRIEF DESCRIPTION OF THE DRAWINGS

The invention is described in more detail below on the basis of practical examples. The associated drawings show the following.

DESCRIPTION OF THE PREFERRED EMBODIMENT

Figure 1:
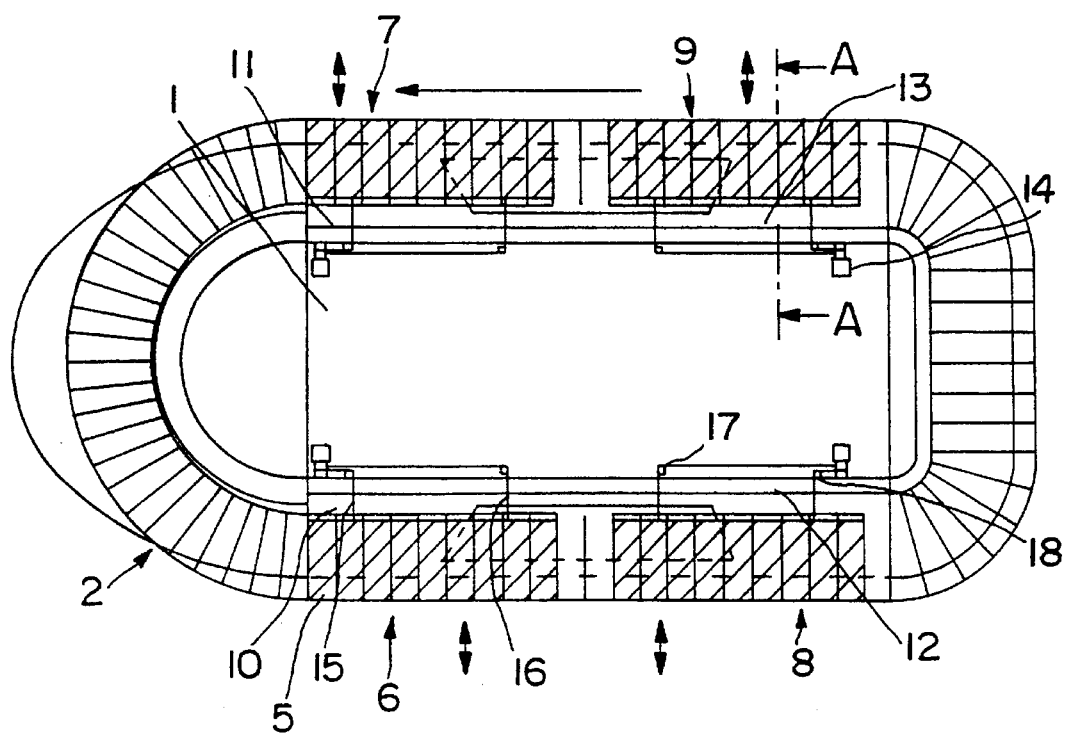
FIG. 1 A schematic top view of the hovercraft according to the invention, with two lateral sections of the finger skirt on each side, each of which can be shifted independently.

According to FIG. 1, the hovercraft comprises a bodywork 1 which is provided with a peripheral elastic skirt 2 to enclose an air-cushion. The air-cushion is generated by a compressor, which is not shown and is mounted on the top segments 5 which are connected to each other and can be moved laterally and, under certain circumstances (ground obstacles), also vertically.

According to the invention, the finger skirt 4 is divided into four sections 6, 7, 8, 9 in such a way that the sections 6, 7, 8, 9 can be laterally moved independently of one another. This means that the skirt segments 5 of a section 6; 7; 8; 9 comprise a group which can be jointly moved laterally.

FIG. 1 shows that two independently and laterally movable sections 6, 7, 8, 9 are provided on each longitudinal side of the hovercraft, which can be operated via cable control devices 10, 11, 12, 13. These cable control devices 10, 11, 12, 13 each comprise a cable winch 14 and two tension cables 15, 16 which are operated jointly by a cable winch 14 and, guided via deflection rollers 17, 18, act on one section 6; 7; 8; 9 at a distance from each other.

Figure 2:
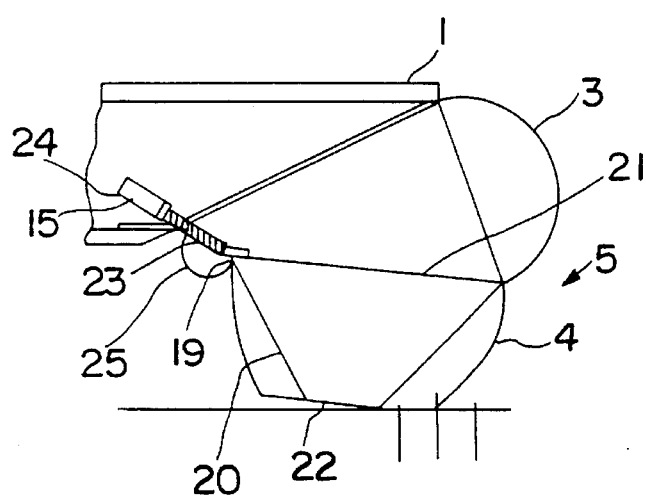
FIGS. 2 A section along Line A—A in FIG. 1, with a schematic representation of a control component.

FIG. 2 shows an arrangement of one of the tension cables 15, 16 in a skirt segment 5. The tension cables 15, 16 are connected to an upper, inside end of the finger skirt 4. Two partial tension cables 20, 21 lead from this connection point 19 to the base 22 of the skirt segment 5 and to the connection between the back skirt 3 and the finger skirt 4. This ensures that the shape of the skirt segments 5 is not changed in the event of lateral deflection of the sections 6, 7, 8, 9 resulting from tensile forces, for example.

A compression spring 23, arranged between the deflection roller 17; 18 or the end of the tube 24, which expediently envelops the tension cables 15, 16, and the connection point 19, serves as a resetting element for the tension cables 15, 16. This ensures that tension cables 15, 16 can be constantly kept under initial tension.

Lateral deflection of the sections 6, 7, 8, 9 outwards, for example, can be achieved simply by letting out the tension cables 15, 16 by the desired amount. The actual deflection of the sections 6, 7, 8, 9 is achieved by the excess pressure in the air-cushion. If the sections 6, 7, 8, 9 need to be deflected inwards, the tension cables 15, 16 must be wound onto the corresponding cable which 14 against the excess pressure of the air-cushion.

Because each section 6; 7; 8; 9 is assigned a corresponding cable control device 10; 11; 12; 13, the sections 6, 7, 8, 9 can be moved independently of each other, as still to be shown.

In order to prevent uncontrolled movement of the finger skirt 4 in the event of one of the tension cables 15, 16 tearing, a safety cable 25 is attached between the connection point 19 and the deflection roller 15; 16. The lateral deflectability of the finger skirt 4 is thus restricted and it is ensured that the journey can be continued without significant limitations.

FIGS. 3 to 22 illustrate different trimming options for the hovercraft.

Figure 3:
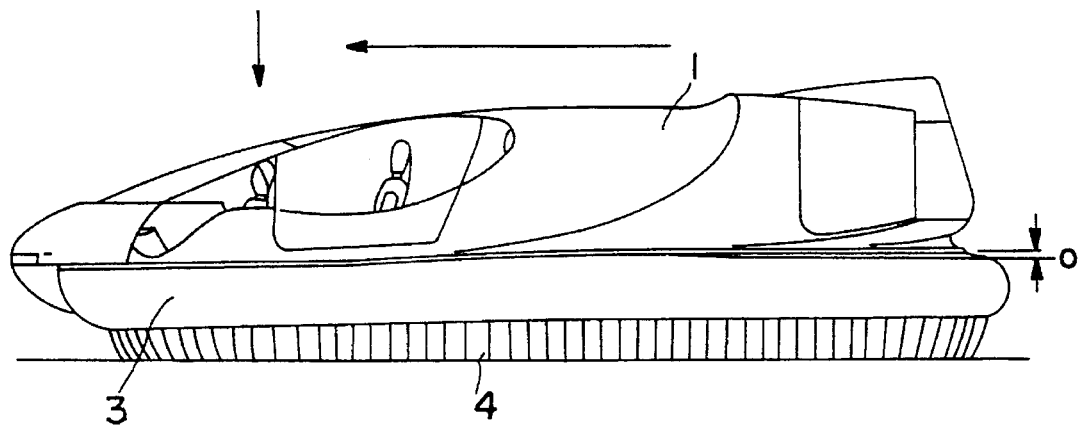
FIGS. 3, 4 The trimming of the hovercraft in the event of forward inclination.
Figure 4:
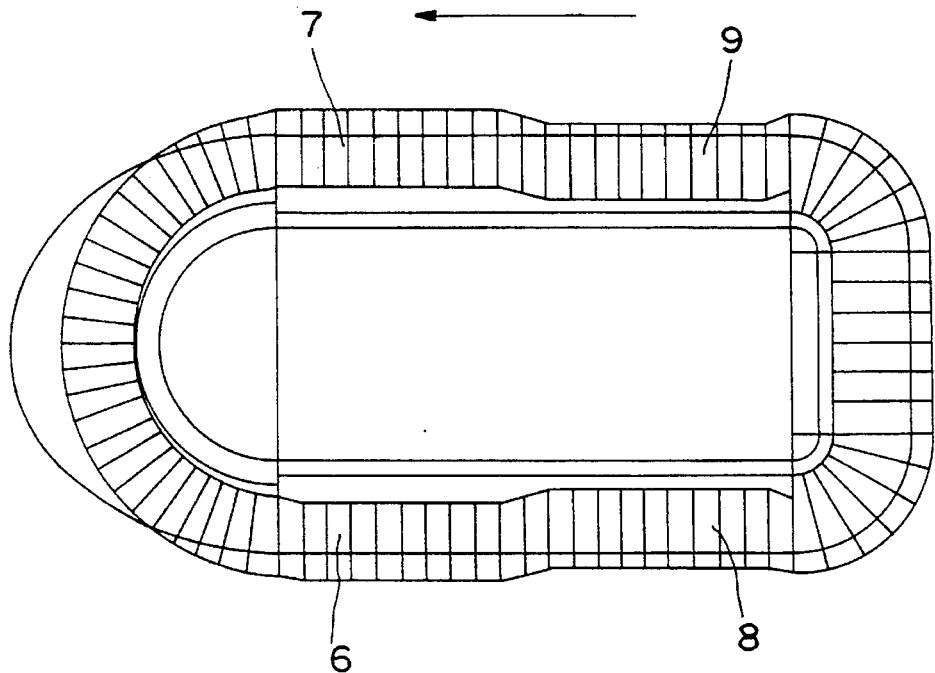

FIGS. 3 and 4 show the trimming of the hovercraft when experiencing a forward shift in the center of gravity. In this case, sections 6, 7 are deflected outwards and sections 8, 9 inwards. This shifts the center of buoyancy of the air-cushion forwards and the forward shift in the center of gravity is balanced out. In the event of only a slight shift in the center of gravity towards the bows of the craft, it may also be sufficient to just deflect the two foremost opposite sections 6, 7 outwards.

Figure 5:
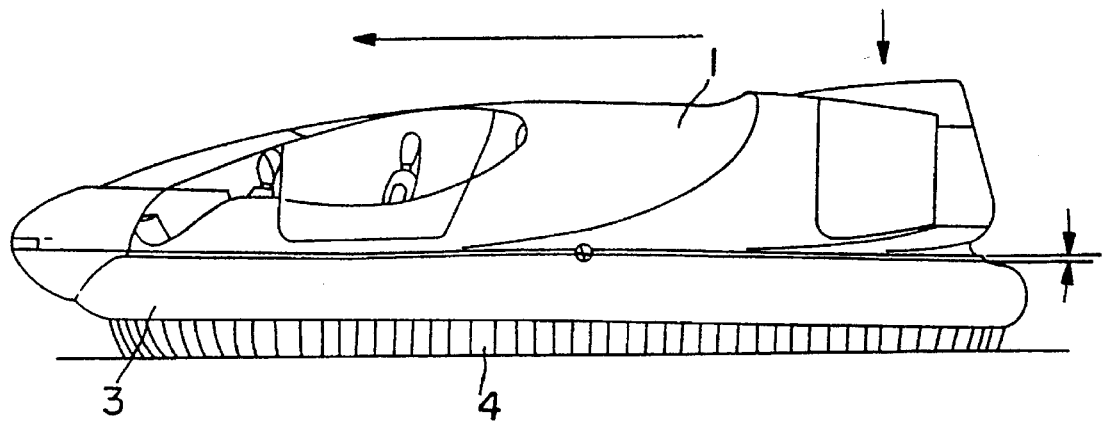
FIGS. 5, 6 The trimming of the hovercraft in the event of backward inclination.
Figure 6:
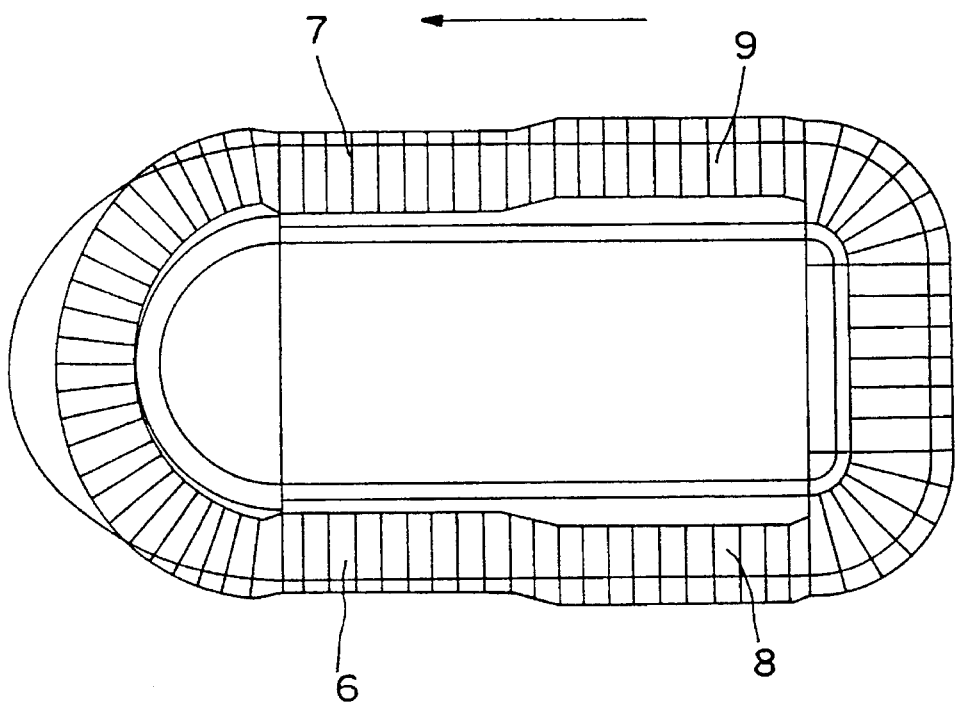
Figure 7:
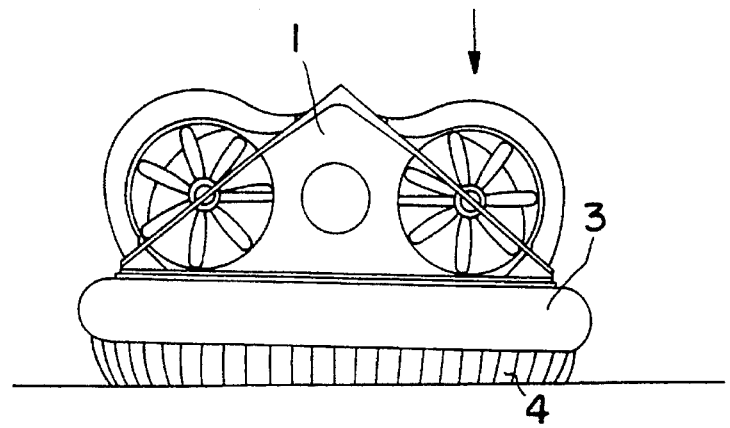
FIGS. 7, 8 The trimming of the hovercraft in the event of inclination to the right.
Figure 8:
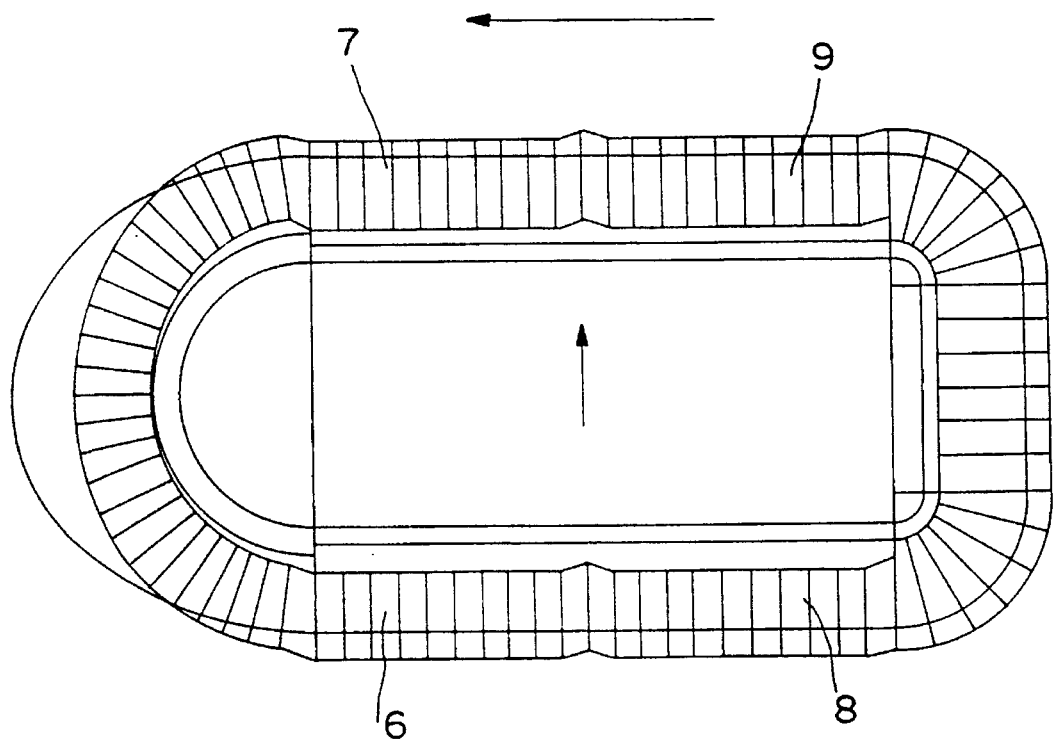
Figure 9:
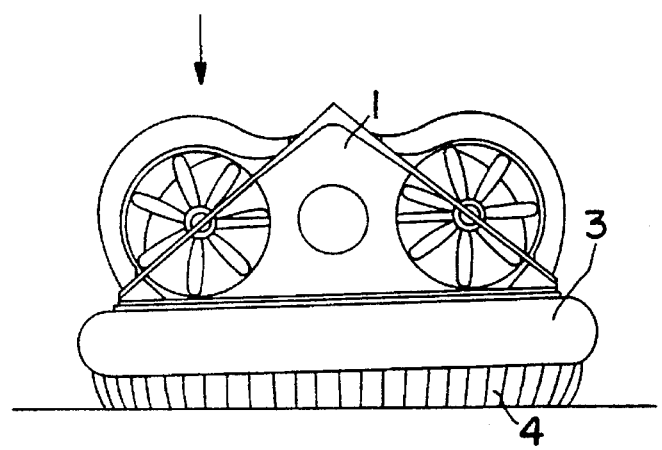
FIGS. 9, 10 The trimming of the hovercraft in the event of inclination to the left.
Figure 10:
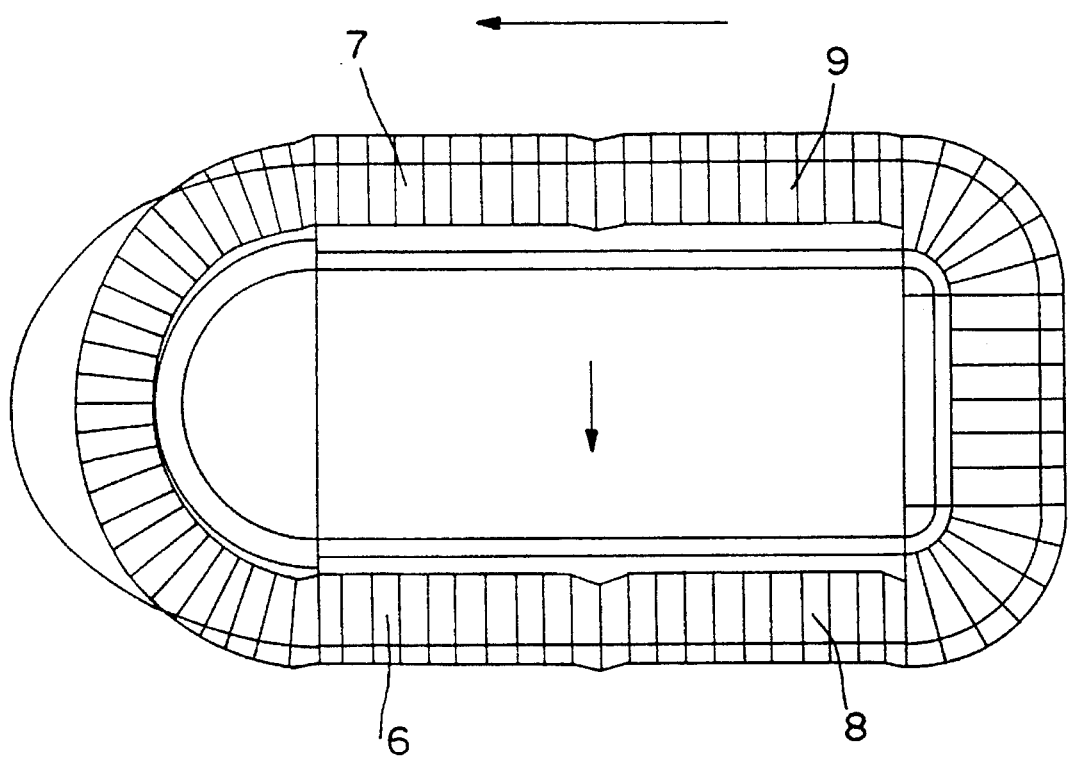
Figure 11:
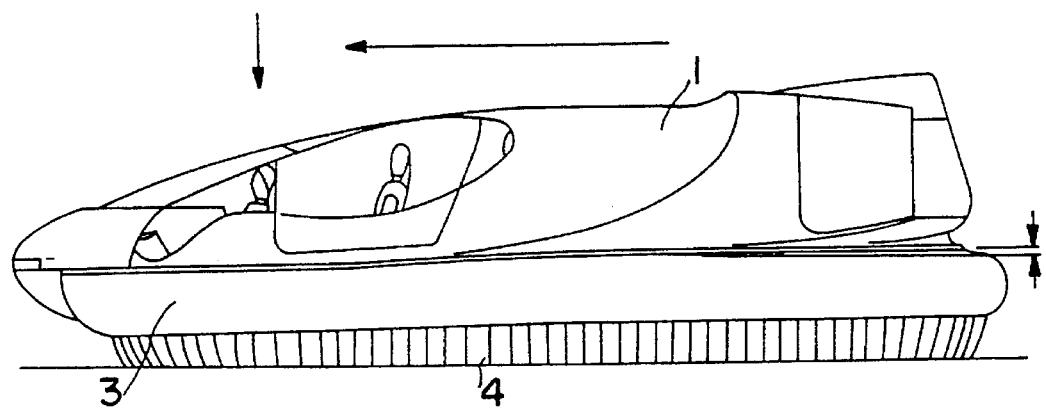
FIGS. 11, 12, 13 The position of the side skirt sections in the event of the hovercraft inclining forwards and to the right.
Figure 12:
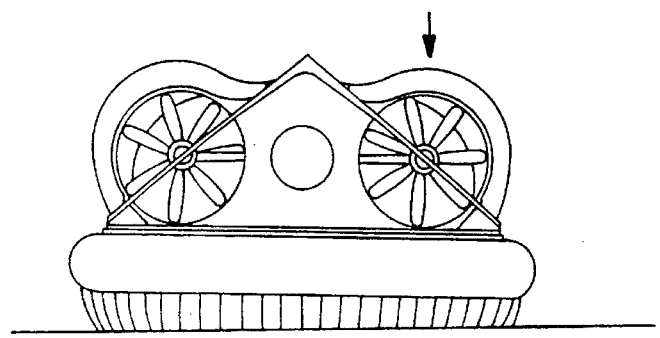
Figure 13:
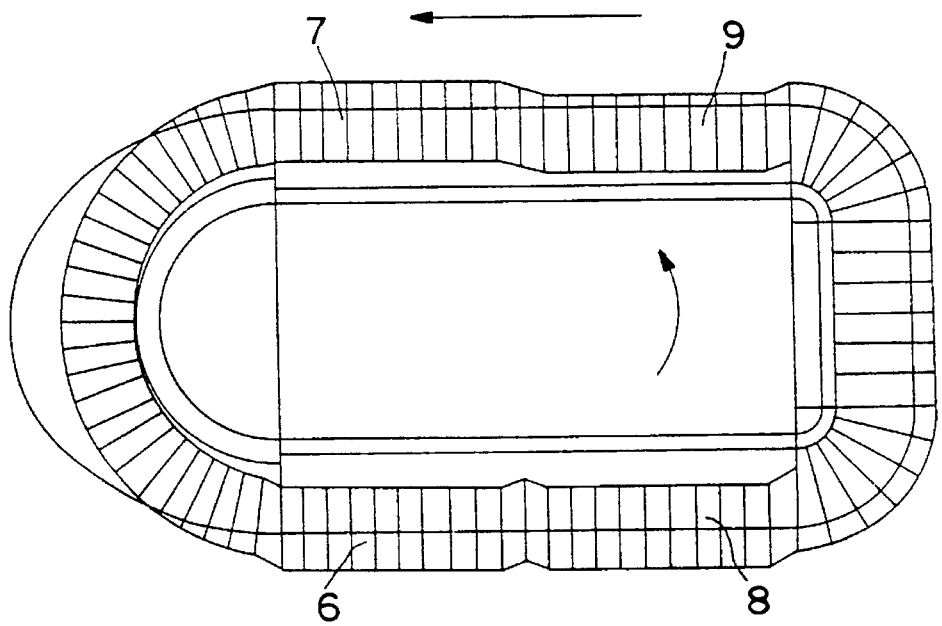
Figure 14:
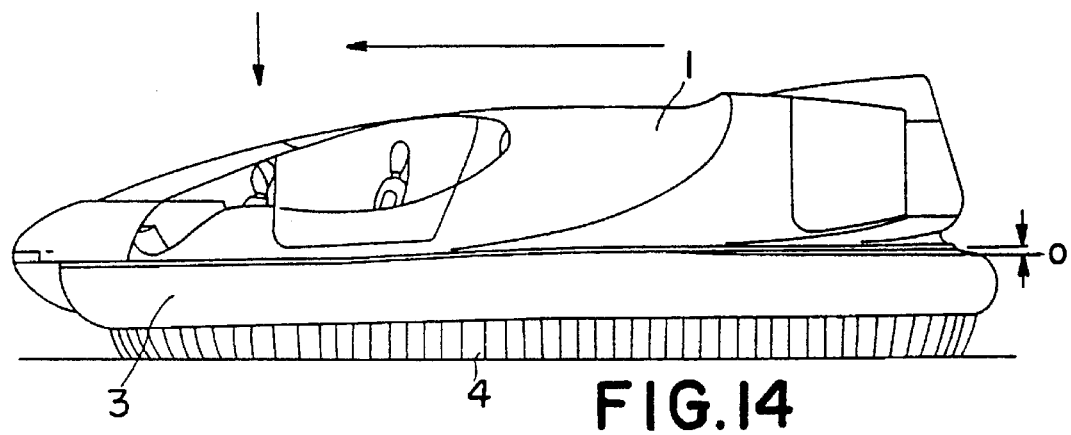
FIGS. 14, 15, 16 The position of the side skirt sections in the event of the hovercraft inclining forwards and to the left.
Figure 15:
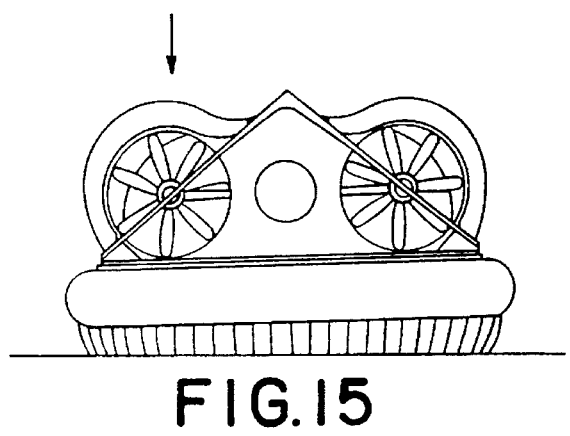
Figure 16:
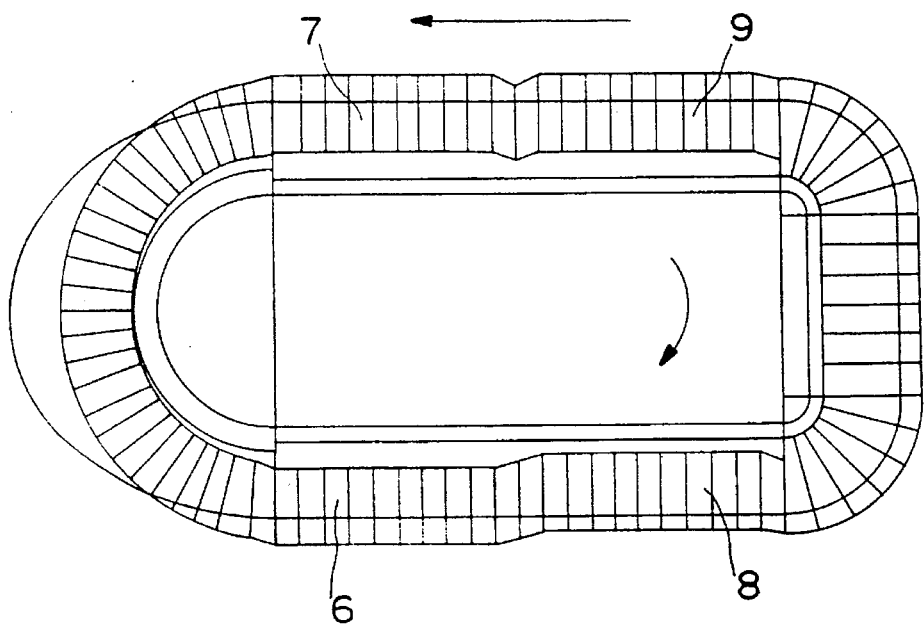
Figure 17:
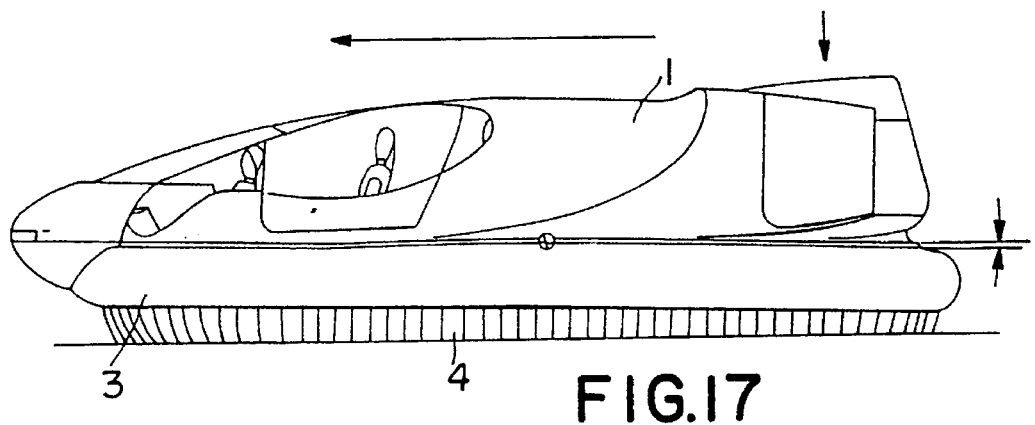
FIGS. 17, 18, 19 The position of the side skirt sections in the event of the hovercraft inclining backwards and to the right.
Figure 18:
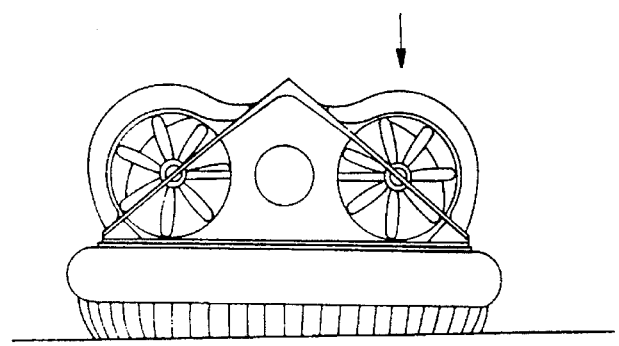
Figure 19:
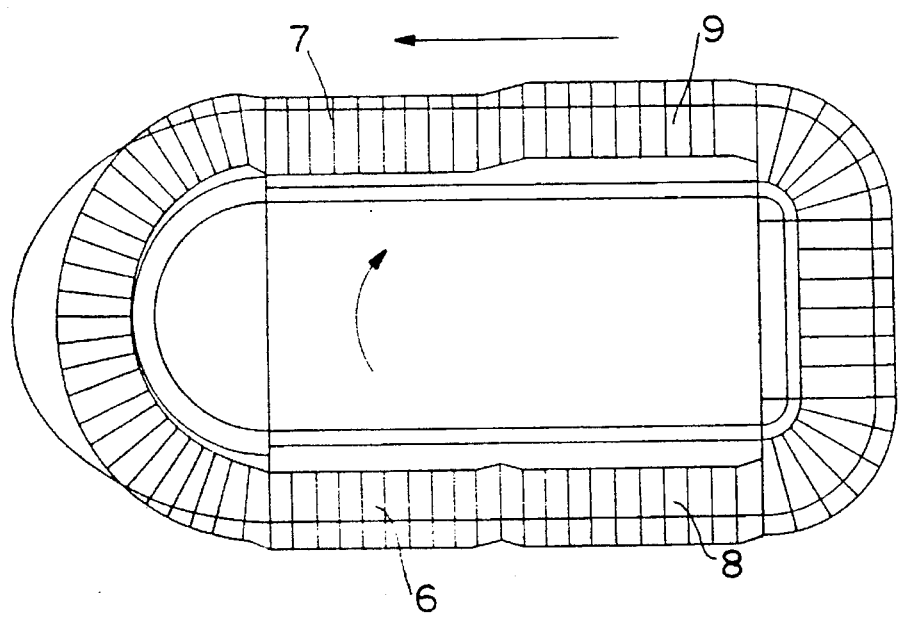
Figure 20:
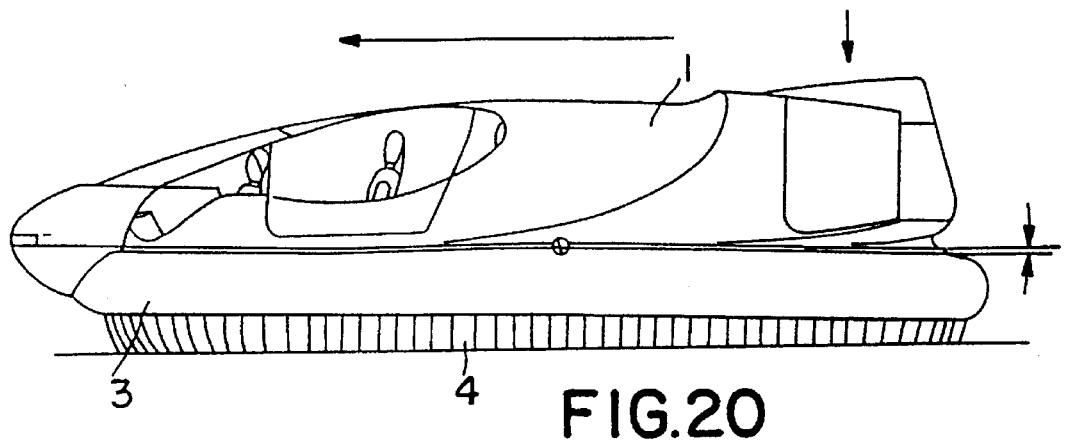
FIGS. 20, 21, 22 The position of the side skirt sections in the event of the hovercraft inclining backwards and to the left.
Figure 21:
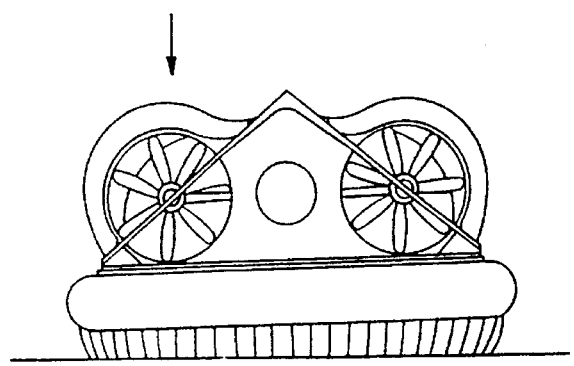
Figure 22:
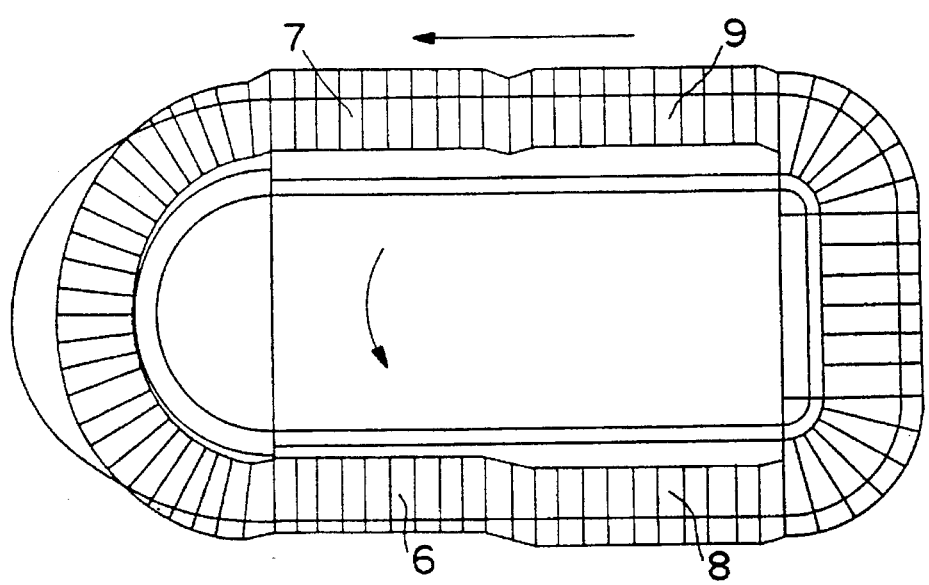

The opposite case is illustrated in FIGS. 5 and 6, with the center of gravity shifting towards the stern of the craft.

The sections 6, 7, 8, 9 must be shifted outwards and inwards accordingly.

It is also possible, when taking a curve course, for example, to intentionally incline the hovercraft in the direction of the intended curve by deflecting the sections (6, 8; 7, 9) of both sides in the same direction. If, for example, the hovercraft is to be inclined to the right (right-hand curve) (FIGS. 7 and 8), the sections 7, 9 and 6, 8 must be deflected to the left (viewed in the direction of travel). If inclination to the left is desired (FIGS. 9 and 10), the sections (7, 9 and 6, 8) must be deflected to the right accordingly.

In the event that a forward shift in the center of gravity is to be compensated for and, at the same time, the stern of the craft is to be turned to the right (FIGS. 11 to 13), the front sections 6, 7 must be moved outwards and the rear sections 8, 9 moved left in the same direction. This asymmetrical deflection of the sections, 6, 7, 8, 9 leads to targeted inclination of the hovercraft and, thus, to varying distances between the finger skirt and the ground or the surface of the water. As a result of this, the amount of compressed air released from the air-cushion is increased at the rear left, causing the stern of the hovercraft to turn to the right as a result of this additional force component.

If the hovercraft is to be turned to the left while experiencing a forward shift in the center of gravity, the front sections (6, 7) must, as described above, be deflected outwards and the rear sections 8, 9 must be deflected to the right.

In the same way, it is likewise possible to turn the front of the craft to the right (FIGS. 17 to 19) or to the left (FIGS. 20 to 22), as previously described. In this case, the rear sections 8, 9 must be deflected outwards and the front sections 6, 8 deflected to the left or to the right in the same direction.

The most diverse shifts in mass can be compensated for by means of the trimming versions described, with a considerable improvement in manoeuvrability being achieved at the same time, both when the hovercraft is stationary and when it is taking a curve course. When executing a curve course, it is merely necessary to displace the center of buoyancy of the air-cushion against the direction of the intended curve, so that the hovercraft inclines into the curve. Significantly tighter curves can thus be taken, which markedly improves the safety when travelling.

Furthermore, it is possible to simultaneously pull all sections 6, 7, 8, 9 inwards. This increases the pressure in the air-cushion, meaning that compression of the elastic skirt 2 in the area of the bows, as may be the case when striking a wave, for example, can be avoided. This measure can also be used to overcome unexpectedly emerging obstacles more easily.

REFERENCE NUMBERS

1 Bodywork
2 Elastic skirt
3 Back skirt
4 Finger skirt
5 Skirt segment
6 Section
7 Section
8 Section
9 Section
10 Cable control device
11 Cable control device
12 Cable control device
13 Cable control device
14 Cable winch
15 Tension cable
16 Tension cable
17 Deflecting roller
18 Deflecting roller
19 Connection point
20 Partial tension cable
21 Partial tension cable
22 Base
23 Compression spring
24 Tube
25 Safety cable

We claim:

1. Static trimmer for a hovercraft, which has at least one compressor mechanism to generate an air-cushion and a bodywork (1) including a peripheral elastic skirt (2) having two parallel lateral areas for laterally limiting the air-cushion, comprising:

the peripheral elastic skirt (2) including a plurality of skirt segments (5) each having a back skirt (3) and a finger skirt (4), the finger skirt (4) connected to the back skirt (3) at a connection point (19) and having a base, the peripheral skirt (2) further including at least two independent lateral sections (6, 7; 8, 9) in each parallel lateral area which can be moved in an inward or outward direction independently of one another; and at least two tension cables (15, 16) disposed in each independent lateral section (6, 7; 8, 9) for moving each finger skirt (4) of each of the plurality of skirt segments (5), each of the at least two tension cables (15, 16) arranged at a distance from each other and guided via at least two deflection rollers (17,18) and each of the at least two tension cables (15,16) further including a first partial tension cable (20) and a second partial tension cable (21), the first partial tension cable (20) acting on the base of the finger skirt (4) and the second partial tension cable (21) acting on the connection point (19) between the back skirt (3) and the finger skirt (4), whereby the center of buoyancy of the air-cushion is displaced in relation to the center of gravity by grouped, lateral adjustments of the plurality of finger skirts (4).

2. Static trimmer for a hovercraft as per claim 1, characterised in that a compression spring (23) is arranged between the deflection roller (17; 18) and the connection point (19).

3. Static trimmer for a hovercraft as per claim 2, characterised in that a safety cable (25) is fitted between the connection point (19) and the deflection roller (17); (18).

4. Static trimmer for a hovercraft as per claim 1, characterised in that each lateral section (6, 7, 8, 9) is provided with a control component.

5. Static trimmer for a hovercraft as per claim 4, characterised in that the control component comprises a cable control device (10, 11, 12, 13), one end of which acts on the finger skirt (4) and the other end of which is provided with a drive component.

6. Static trimmer for a hovercraft as per claim 5, characterised in that the drive component comprises a cable winch (14) fixed in place beneath the bodywork (1) of the hovercraft.

7. Static trimmer for a hovercraft as per claim 1, characterised in that the at least two tension cables (15, 16) move the plurality of skirt segments (5) of one of the two parallel lateral areas in the same direction.

8. Static trimmer for a hovercraft as per claim 1, characterised in that the at least two tension cables (15, 16) move the plurality of skirt segments (5) in the at least two independent lateral sections (6, 7; 8, 9) of both of the two parallel lateral areas in the same direction.

9. Static trimmer for a hovercraft as per claim 1, characterised in that the at least two tension cables (15, 16) move the plurality of skirt segments (5) in only one of the at least two independent lateral sections (6, 7; 8, 9).

10. Static trimmer for a hovercraft as per claim 1, characterised in that the at least two tension cables (15, 16) move the plurality of skirt segments (5) in two opposite independent lateral sections (6, 7; 8, 9) either in the same direction or in opposite directions.

11. Static trimmer for a hovercraft as per claim 1, characterised in that the at least two tension cables (15, 16) move the plurality of skirt segments (5) in two diagonally opposite independent lateral sections (6, 7; 8, 9) in the same direction.

12. Static trimmer for a hovercraft as per claim 1, characterised in that the at least two tension cables (15, 16) simultaneously move the plurality of skirt segments (5) of each of the two parallel lateral areas inward.

* * * * *

UNITED STATES PATENT AND TRADEMARK OFFICE
CERTIFICATE OF CORRECTION

PATENT NO. : 5,520,261
DATED : May 28, 1996
INVENTOR(S) : Stiegler, et al

It is certified that error appears in the above-indentified patent and that said Letters Patent is hereby corrected as shown below:

On the title page, item [57] ABSTRACT, line 21, "fingers" should read --finger--;

Column 3, line 16
"air-suction" should be --air-cushion--;
      Column 3, line 34
"Figs." should be --Fig.--; and
      Column 5, line 29
after "sections 6", "8" should be --7--.

Signed and Sealed this

Seventh Day of January, 1997

*Attest:*

BRUCE LEHMAN

*Attesting Officer*    *Commissioner of Patents and Trademarks*